(12) United States Patent
Wolf

(10) Patent No.: US 7,950,855 B2
(45) Date of Patent: May 31, 2011

(54) BEARING ASSEMBLY

(75) Inventor: Thomas Wolf, Schweinfurt (DE)

(73) Assignee: Aktiebolaget SKF, Gothenburg (SE)

( * ) Notice: Subject to any disclaimer, the term of this patent is extended or adjusted under 35 U.S.C. 154(b) by 413 days.

(21) Appl. No.: 12/096,637

(22) PCT Filed: Nov. 30, 2006

(86) PCT No.: PCT/EP2006/011487
§ 371 (c)(1),
(2), (4) Date: Oct. 3, 2008

(87) PCT Pub. No.: WO2007/065592
PCT Pub. Date: Jun. 14, 2007

(65) Prior Publication Data
US 2009/0208160 A1   Aug. 20, 2009

(30) Foreign Application Priority Data

Dec. 7, 2005   (DE) .......................... 10 2005 058 396

(51) Int. Cl.
*F16C 19/14* (2006.01)
(52) U.S. Cl. ...................................... 384/454
(58) Field of Classification Search .......... 384/452–455, 384/494
See application file for complete search history.

(56) References Cited

U.S. PATENT DOCUMENTS

| | | | | |
|---|---|---|---|---|
| 651,772 A * | 6/1900 | Robertson | ..................... | 384/454 |
| 675,618 A | 6/1901 | Bartholomew | | |
| 2,208,724 A | 7/1940 | Griswold | | |
| 3,476,453 A | 11/1969 | Kastner | | |
| 3,920,292 A | 11/1975 | Haussels | | |
| 4,895,458 A | 1/1990 | Gerster | | |
| 5,261,750 A * | 11/1993 | Eckhardt et al. | ............... | 384/455 |
| 2002/0076126 A1 * | 6/2002 | Plesh, Sr. | ...................... | 384/454 |

FOREIGN PATENT DOCUMENTS

| | | |
|---|---|---|
| DE | 68 201 C | 4/1891 |
| DE | 14 16 695 | 9/1937 |
| DE | 1 836 077 U | 8/1961 |
| DE | 1 239 542 | 4/1967 |
| DE | 1 625 610 | 5/1971 |
| DE | 2 312 570 | 9/1974 |
| DE | 27 38 287 | 3/1979 |

(Continued)

OTHER PUBLICATIONS

International Search Report and Written Opinion issued in International Application No. PCT/EP2006/011487 with English language translation.

International Preliminary Report on Patentability and Written Opinion (Forms PCT/IB/338, PCT/IB/373 and PCT/ISA/237 issued in International Patent Application No. PCT/EP2006/011487, Oct. 23, 2008, The International Bureau of WIPO, Geneva, CH.

*Primary Examiner* — Thomas R Hannon
(74) *Attorney, Agent, or Firm* — Buchanan, Ingersoll & Rooney PC

(57) ABSTRACT

A bearing assembly for radial and axial support of a shaft part relative to a housing includes two radial antifriction bearings located at an axial distance to one another on the shaft part and two axial antifriction bearings located at an axial distance to one another on the shaft part. To create better support, the bearing assembly has an outer bearing ring which is inserted into a hole of the housing and which, made as a one-piece component, has tracks for the two radial antifriction bearings and for the two axial antifriction bearings.

20 Claims, 3 Drawing Sheets

FOREIGN PATENT DOCUMENTS

Figure 1:
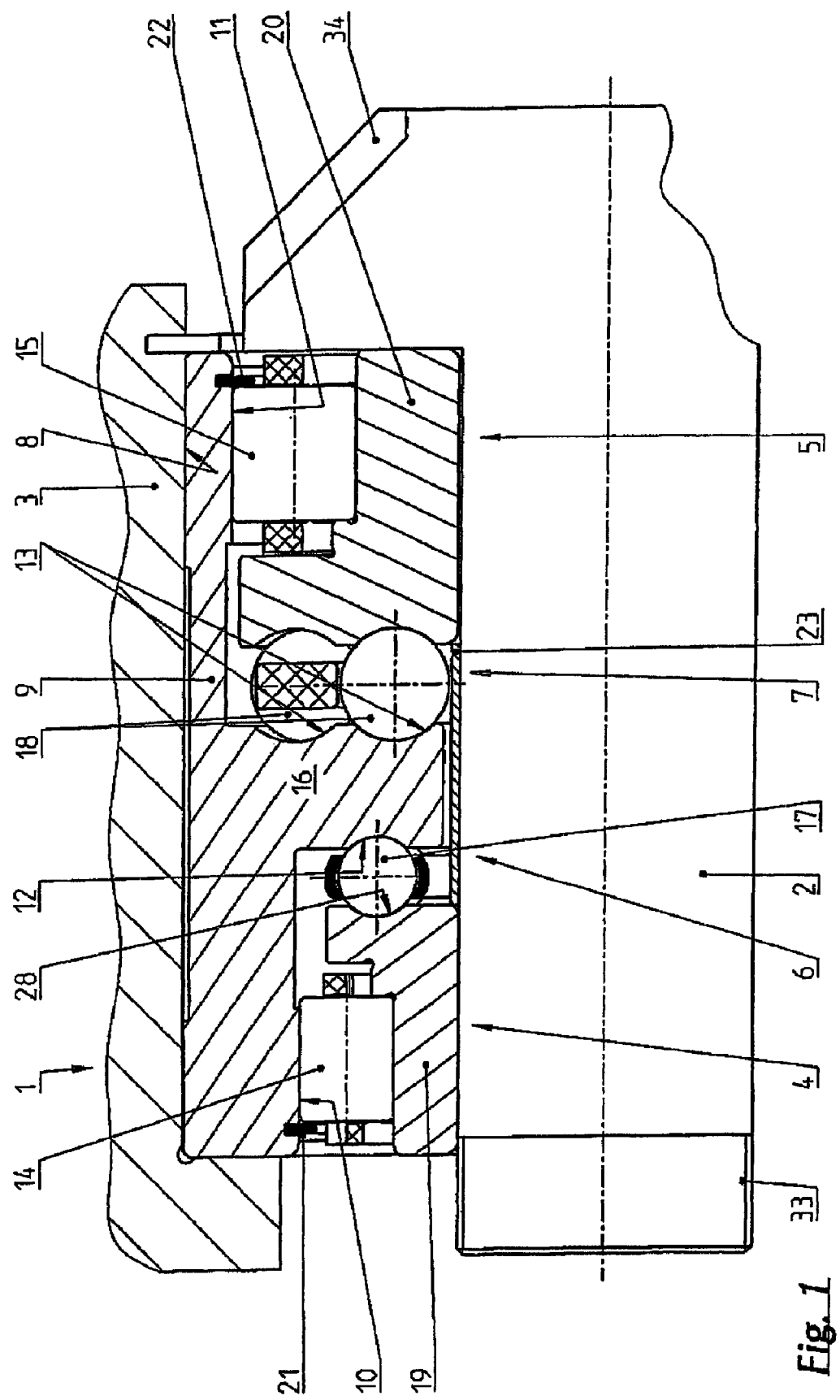

| | | |
|---|---|---|
| DE | 37 32 730 C2 | 4/1989 |
| DE | 10 111 569 A1 | 9/2002 |
| EP | 1 170 519 A2 | 6/2001 |
| GB | 01715 A | 5/1911 |
| JP | 6-323329 | 11/1994 |
| JP | 2003166626 A | 6/2003 |
| JP | 2003166627 A | 6/2003 |
| WO | WO 02/48560 A1 | 6/2002 |

* cited by examiner

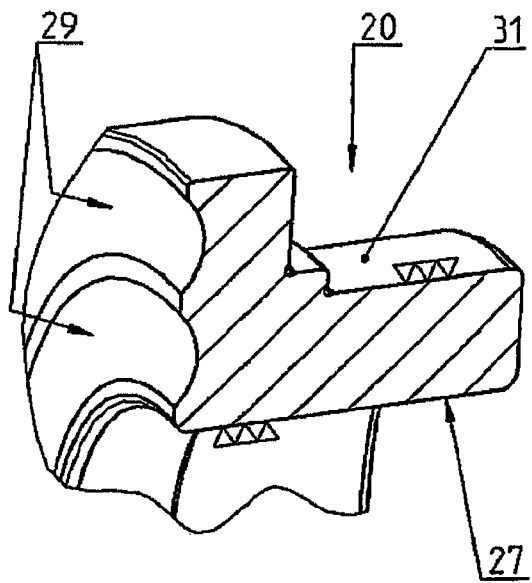
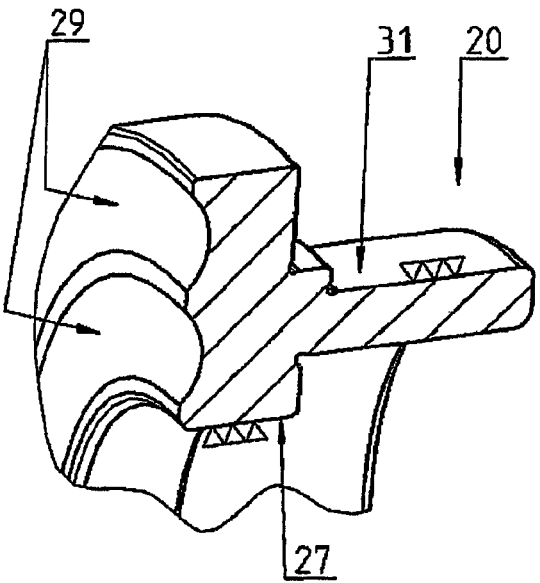
*Fig. 3a*  *Fig. 3b*
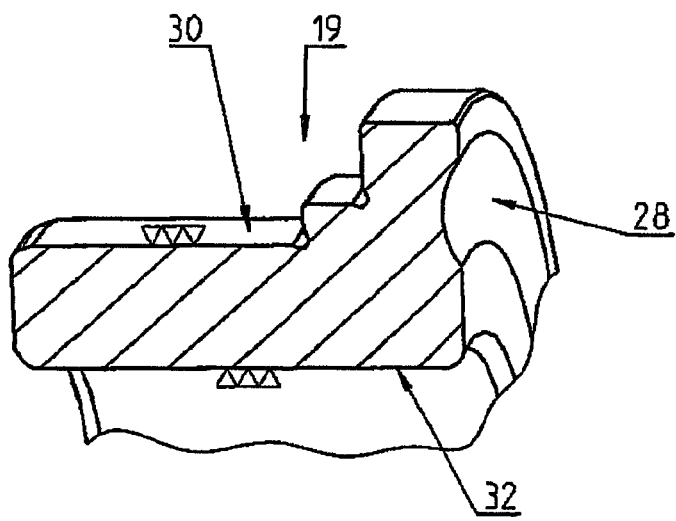
*Fig. 4*

BEARING ASSEMBLY

TECHNOLOGICAL FIELD

The invention relates to a bearing assembly for radial and axial support of a bevel pinion of the vehicle axle drive relative to a housing, the bearing assembly having two radial antifriction bearings which are located at an axial distance to one another on the bevel pinion and two axial antifriction bearings which are located at an axial distance to one another on the bevel pinion.

BACKGROUND DISCUSSION

To support bevel pinion shafts in axle drives of motor vehicles, especially in rear axle drives, classically conical roller bearings or angular ball bearings in an O-arrangement are used. By way of example, reference is made to JP 06-323329 A. These bearing arrangements are mounted with pretensioning and offer favorable radial and axial fixing of the pinion shaft.

Another bearing arrangement of a bevel pinion shaft is known from JP 2003-166627. To support the shaft two ball bearings and one cylindrical roller bearing are used here. The bearings are located next to one another, partially spaced apart from one another by spacer sleeves.

Fundamentally bearing assemblies can also be used which have two radial bearings which are spaced apart from one another and two axial bearings which are spaced apart from one another according to the initially mentioned type.

Examples of the latter construction are known for the most varied applications from DE 68 201 C, WO 02/48560 A1, DE 1 239 542 C, DE-AS 16 25 610, DE 14 16 695 U, U.S. Pat. No. 675,618, U.S. Pat. No. 2,208,724, DE 37 32 730 C2, JP 2003-166626 A, JP 2003-166627 and DE 18 36 077 U.

Existing bearing assemblies, depending on the construction, have more or less high friction losses so that the efficiency of the bearing arrangement is not always optimum; in part not inconsiderable heating of the bearing assembly in operation occurs. Furthermore, depending on the design a certain wear occurs which is undesirable. Depending on the indicated parameters partially adverse effects on oil ageing and the service life of the bearing assembly arise.

It is desirable to reduce the indicated disadvantages by developing the known bearing assemblies.

SUMMARY

Therefore the object of the invention is to further develop a bearing assembly of the initially mentioned type such that the indicated disadvantages are reduced as much as possible, i.e. the power loss will be minimum and the efficiency will be accordingly high so that inherent heating of the bearing which is as small as possible occurs. Furthermore, the tendency of the bearing assembly to wear will be as low as possible. Finally, another objective is that production and installation of the bearing assembly will be possible in an especially efficient and thus economical manner.

This object is achieved by the invention in that the bearing assembly has an outer bearing ring which is or which can be inserted into a hole of the housing and which, made as a one-piece component, has tracks for the two radial antifriction bearings and for the two axial antifriction bearings, one axial antifriction bearing which is located away from the teeth of the bevel pinion being made as a single-row bearing and the other axial antifriction bearing which is adjacent to the teeth of the bevel pinion being made as a twin-row bearing which has two rows of roll bodies which lie on different radii.

In this connection preferably the two radial antifriction bearings are made as cylindrical roller bearings and the two axial antifriction bearings are made as ball bearings. In this case the outer bearing ring in its axial end regions can have one cylindrical track each for stopping the cylindrical rollers of the cylindrical roller bearings, between the two tracks a radially extending annular section being located in whose ends sides which face away from one another the tracks are made for stopping of the roll bodies, especially balls, of the two axial antifriction bearings.

Since the magnitude of the axial forces to be transferred in a control application is (radically) different in the two axial directions, the axial antifriction bearing located at a distance from the teeth of the bevel pinion is made as a single-row bearing, while the other axial antifriction bearing which is adjacent to the teeth of the bevel pinion is made as a twin-row bearing, i.e. it has two rows of roll bodies which lie on different radii. Therefore it can also be provided that the single-row axial antifriction bearing has balls with a diameter which is less than the diameter of the balls of the twin-row axial antifriction bearing. It can also be provided by the asymmetrical force distribution that the two radial antifriction bearings are dimensioned differently. In this connection it is also recommended that the roll bodies, especially the cylindrical rollers, of the two radial antifriction bearings are located on different diameters.

At least one inside bearing ring is made especially preferably as a ring with a contour which is L-shaped in a radial section. This configuration yields an especially compact and stiff structure of the bearing assembly.

The two radial antifriction bearings and the two axial antifriction bearings are preferably made as a captive, preassembled unit so that handling and final installation of the bearing assembly are possible in a very economical manner. Two snap rings which are inserted into grooves in the outer bearing ring and which at the same time constitute an axial stop for the cylindrical rollers protect the unit from being lost.

Adjustable pretensioning in the bearing assembly can be easily implemented if between the two inner bearing rings there is a spacer sleeve which keeps the two inner bearing rings at an axial distance. The spacer sleeve is preferably made as a hollow-cylindrical body which allows especially elastic compression in the axial direction. For this purpose the radial thickness of the spacer sleeve is preferably between 1 mm and 2 mm.

The roll bodies can be produced especially for high performance applications from ceramic (silicon nitride) instead of from antifriction bearing steel. Thus especially very high engine speeds can be driven better. The use of ceramic as the material for the roll bodies due to the lower centrifugal forces leads to correspondingly lower Hertzian stresses in rolling contact of the outer ring.

According to one development of the invention, there can be an integrated seal of the bearing assembly, especially on the flange side of the pinion. For this purpose, to hold a radial shaft packing ring both the outer ring and also the inner ring can be lengthened accordingly. The radial shaft packing ring can be inserted into the hole of the outer ring after actual installation of the bearing unit. A lengthened part of the inner ring which has been ground free of twists can be used as the running surface for the sealing lip of the radial shaft packing ring.

The suggested bearing assembly as claimed in the invention is a component of the vehicle axle drive, especially the rear axle drive of a vehicle. It supports the shaft of a bevel pinion.

The proposed bearing assembly is characterized by very low power loss and thus by high efficiency. Inherent heating of the bearing assembly is therefore relatively low.

Relatively low-wear operation is possible, i.e. the service life of the bearings is relatively high.

The relatively slow ageing of the lubricant, especially of the oil, should be mentioned as positive.

BRIEF DESCRIPTION OF THE DRAWING FIGURES

Embodiments of the invention are shown in the drawings.

Figure 2:
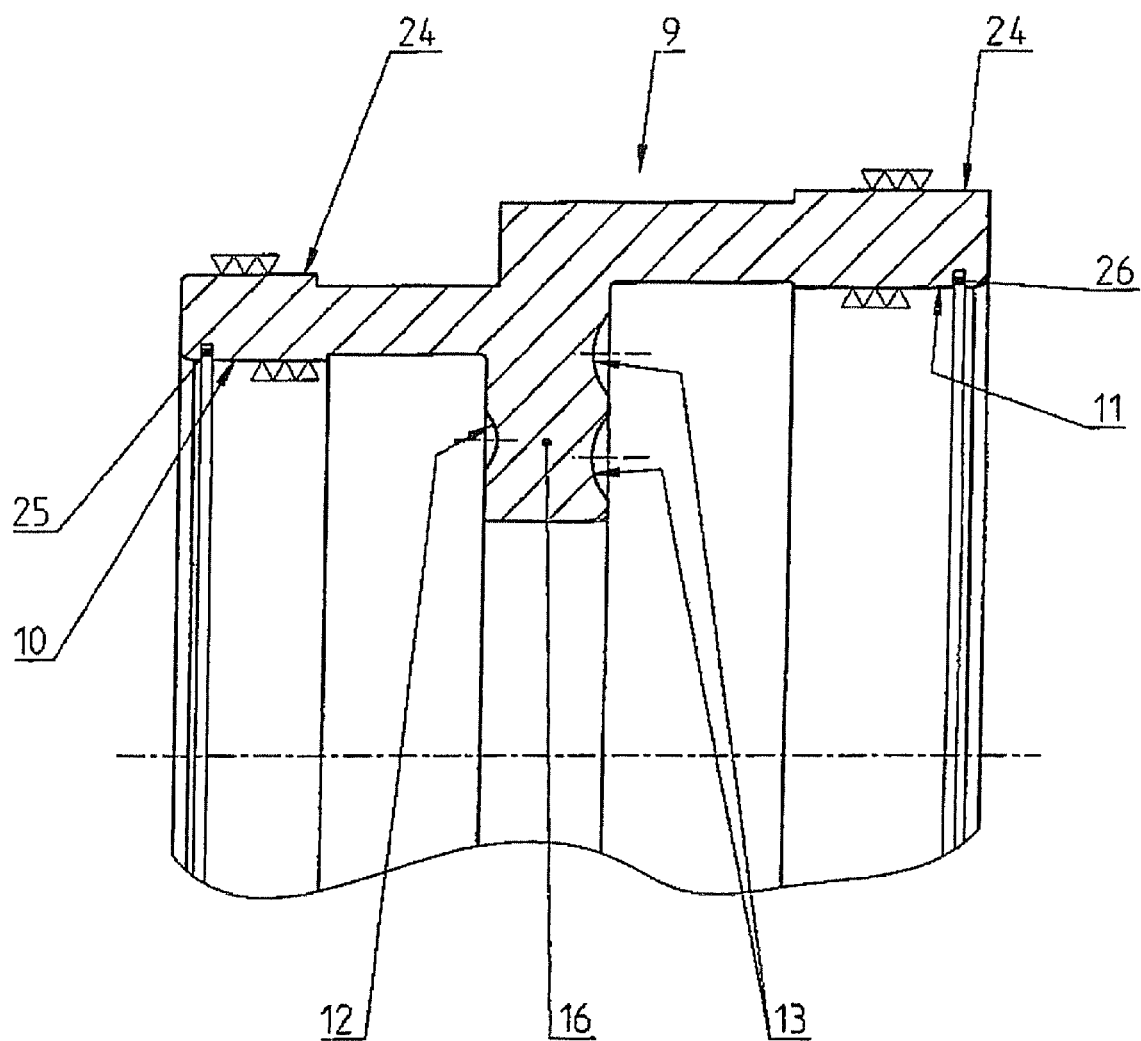

FIG. 1 shows a radial section through a bearing assembly for a bevel pinion shaft, FIG. 2 shows a radial section through the outer bearing ring in one alternative version, FIG. 3a shows in a perspective view one part of one inner bearing ring in the embodiment as shown in FIG. 1, FIG. 3b shows in a representation analogous to FIG. 3a one alternative version of the inner bearing ring and FIG. 4 shows in a perspective part of the other inner bearing ring in an embodiment as shown in FIG. 1.

DETAILED DESCRIPTION

FIG. 1 shows a bearing assembly 1 which radially and axially supports a shaft part 2 in the form of a bevel pinion shaft with a bevel pinion 34 relative to the housing 3. The bearing arrangement 1 is located in a hole 8 in the housing 3. It has two radial antifriction bearings 4 and 5 which are made as cylindrical roller bearings, and two axial antifriction bearings 6 and 7 which are made as ball bearings. Both the cylindrical roller bearings 4, 5 and also the axial ball bearings 6, 7 are each located at an axial distance to one another.

The outer bearing ring 9 is made in one piece and has all the tracks 10, 11, 12 and 13 for the two cylindrical roller bearings and for the two axial ball bearings. The two cylindrical tracks 10 and 11 for the two cylindrical roller bearings are located in the two axial end regions of the outer bearing ring 9. In the middle region an annular section 16 extends radially to the inside. In this connection the ball tracks 12 and 13 are machined onto the two end sides of the annular section 16, which sides each have a surface normal which points in the axial direction.

The two inner bearing rings 19 and 20 are made such that in the radial section as is shown in FIG. 1, FIGS. 3a, 3b and FIG. 4, there is a L-shaped contour. Each of the two inner bearing rings 19, 20 has a cylindrically made track 30 and 31 (see FIGS. 3a, 3b and 4) for stopping the cylindrical rollers 14, 15 and a track 28, 29 for stopping the balls 17, 18 of the axial ball bearings 6, 7. The inner bearing rings 19, 20 also have respective cylindrical inner surfaces 27 and 32 (see FIGS. 3a, 3b, 4) with which the bearing arrangement 1 can be located on the cylindrical seat of the shaft part 2.

The two inner bearing rings 19, 20 are held at an axial distance by a spacer sleeve 23. The spacer sleeve 23 is made as a hollow-cylindrical body with a small wall thickness so that it has relatively low stiffness. This makes it possible, after mounting the bearing arrangement on the shaft part 2, to screw a nut which is not shown in FIG. 1 onto the threaded section 33 and to secure it until the desired pretensioning is present in the bearing assembly.

FIG. 2 shows an outer bearing ring 9 in a somewhat different version than in FIG. 1, there being two relatively short cylindrical outer surfaces 24 here which sit in the corresponding hole sections 8 in the housing 3. Grooves 25 and 26 in the axial end region of the cylindrical roller tracks 10 and 11 can be recognized here. As follows from a combined examination with FIG. 1, after premounting of the bearing assembly 1 the snap rings 21 and 22 are inserted into the grooves 25 and 26 so that the axial mobility of the cylindrical rollers 14, 15 is limited. Thus a unit is formed which captively has all bearings 4, 5, 6, 7 and which can be especially easily installed.

In the case of an axle drive, especially for pinon bearing units for the rear axle drives of motor vehicles or for power dividers, between the ring gear which is not shown and the bevel pinion 34, forces act which are therefore accommodated by the two cylindrical roller bearings 4, 5 and the two axial ball bearings 6, 7 which together form a self-retaining pinion bearing unit. In the arrangement and dimensioning of the four rows of bearings or bearing sites, the different amounts and directions of the tooth forces between the bevel pinion 34 and the ring gear are considered. The choice of bearing models and their installation allow transfer of force almost without friction and thus a considerable reduction of the power loss in vehicle operation. The characteristic of stiffness which is important in the support of bevel gear drives is taken into account mainly in the axial direction by the use of axial ball bearings.

The bevel pinion shaft 2 of a power divider which is shown in FIG. 1 has a shoulderless shaft on whose right end the bevel pinion 34 sits. The cylindrical roller bearing 5 which is adjacent to the bevel pinion 34 due to the high radial force acting between the bevel pinion 34 and the ring gear is made thicker than the cylindrical roller bearing 4 which is located on the flange-side end of the bevel pinion shaft 2. In pulling operation the axial force acting in the teeth is accommodated by the twin-row axial ball bearing 7 and fed into the drive housing 3 via the end side of the annular section 16 of the outer bearing ring 9. Conversely, in pushing operation (driving forward) or pulling operation (driving backward) the axial force acting in the opposite direction is accommodated by the smaller single-row axial ball bearing 6 and routed into the drive housing 3 by way of the other end side of the annular section 16.

In the case of a power divider for all-wheel drive the more supportive bearing rows of the cylindrical roller bearing and of the axial ball bearing interchange their positions with those of the less supportive bearing.

The two snap rings 21 and 22 are used for axial guidance of the cylindrical rollers 14, 15 and for captive closing of the bearing unit.

The mounting process is as follows:

First, the twin-row axial ball bearing set which is self-retaining by means of the corresponding cage is inserted into the tracks 13 of the annular section 16. Then the inner bearing ring 20 which is L-shaped in a radial section is added. Then the pinion head-side cylindrical roller set 15 which is self-retaining by means of a corresponding cage is added. By inserting the snap ring 22 the twin-row ball bearing set 18 and the cylindrical roller set 15 are axially secured.

Then the deformable intermediate sleeve 23 is slipped on. Mounting of the part of the bearing assembly 1 which is the left part in FIG. 1 with the bearings 4 and 6 then takes place in a corresponding or analogous manner to mounting of the bearings 5 and 7. After insertion of the snap ring 21 a captive bearing assembly has been formed which can be easily assembled in final form, i.e. inserted into the housing hole 3.

In this final installation of the bevel pinion shaft 2 with the self-retaining bearing unit, the two inner rings 19 and 20 together with the deformable spacer sleeve 23 which lies in between are pushed jointly onto the pinion shaft 2. The force flows first via the two inner rings 19 and 20 and the intermediate sleeve 23. only when a specific tightening moment of the nut which is to be screwed onto the threaded section 33 has been exceeded is the corresponding pretensioning in the axial ball bearings 6, 7 built up by the characteristic of the deformable spacer sleeve 23.

The spacer sleeve 23 can also be completely omitted; this can be especially recommended for reasons of economy. In this case the desired pretensioning can be implemented with relative precision by way of selection of a corresponding specified tightening moment of the pinion nut. In the case of mounting without an intermediate sleeve, therefore first the pinion shaft is inserted into the hole of the inner bearing ring 20 and then guided with simultaneous axial support on the side surface of the inner bearing ring 19 through the hole of the latter. Therefore mounting is completed in this case by controlled tightening of the pinion nut.

The invention claimed is:

1. Bearing assembly for radial and axial support of a bevel pinion relative to a housing, the bearing assembly comprising radial antifriction bearings which are located at an axial distance to one another on the bevel pinion and two axial antifriction bearings which are located at an axial distance to one another on the bevel pinion, an outer bearing ring adapted to be inserted into a hole of the housing and which, made as a one-piece component, has tracks for the radial antifriction bearings and for the two axial antifriction bearings one of the axial antifriction bearings which is located away from teeth of the bevel pinion being made as a single-row bearing and the other axial antifriction bearing which is adjacent to the teeth of the bevel pinion being made as a twin-row bearing which has two rows of roll bodies which lie on different radii.

2. Bearing assembly as claimed in claim 1, wherein the two radial antifriction bearings are cylindrical roller bearings.

3. Bearing assembly as claimed in claim 2, wherein the tracks of the outer bearing ring comprise a cylindrical track at each axial end region of the outer bearing ring for stopping cylindrical rollers of the cylindrical roller bearings, the outer bearing ring also comprising a radially extending annular section located between the cylindrical tracks, the radially extending annular section of the outer bearing ring possessing end sides which face away from one another, the end sides of the radially extending annular section comprising tracks for stopping the roll bodies of the two axial antifriction bearings.

4. Bearing assembly as claimed in claim 1, wherein the two axial antifriction bearings are ball bearings.

5. Bearing assembly as claimed in claim 1, wherein the roll bodies are balls and the single-row axial antifriction bearing has balls with a diameter which is less than the diameter of the balls of the twin-row axial antifriction bearing.

6. Bearing assembly as claimed in claim 1, wherein the radial antifriction bearings are dimensioned differently.

7. Bearing assembly as claimed in claim 6, wherein the radial antifriction bearings each comprise roll bodies, and the roll bodies of the two radial antifriction bearings are located on different diameters.

8. Bearing assembly as claimed in claim 1, further comprising at least one inside bearing ring possessing a contour which is L-shaped in a radial section.

9. Bearing assembly as claimed in claim 1, wherein the radial antifriction bearings and the two axial antifriction bearings are a captive, preassembled unit.

10. Bearing assembly as claimed in claim 9, wherein two snap rings are positioned in grooves in the outer bearing ring.

11. Bearing assembly as claimed in claims 1, further comprising two inner bearing rings, and a spacer sleeve positioned between the two inner bearing rings which keeps the two inner bearing rings at an axially spaced apart distance.

12. Bearing assembly as claimed in claim 11, wherein the spacer sleeve is a hollow-cylindrical body which allows elastic compression in the axial direction.

13. Bearing assembly as claimed in claim 12, wherein the spacer sleeve possesses a radial thickness between 1 mm and 2 mm.

14. Bearing assembly as claimed in claim 1, wherein the single-row bearing and the radial antifriction bearings comprise roll bodies made of ceramic material, and wherein the roll bodies of the twin-row bearing are made of ceramic material.

15. Bearing assembly as claimed in claim 1, further comprising a seal arrangement at least in one axial end region of the bearing arrangement, the seal arrangement being positioned between the outer bearing ring and the inner bearing ring.

16. Bearing assembly for radial and axial support of a bevel pinion relative to a housing, the bearing assembly comprising:
a first axial antifriction bearing comprised of a single-row bearing, the single-row bearing comprising only a single row of first roll bodies;
a second axial antifriction bearing comprised of a twin-row bearing, the twin-row bearing comprising two rows of second roll bodies which lie on different radii;
the single-row bearing and the twin-row bearing being axially spaced apart from one another along the bevel pinion;
two radial antifriction bearings axially spaced apart from one another along the bevel pinion, one of the two radial antifriction bearings comprising third roll bodies and the other radial antifriction bearing comprising fourth roll bodies;
the two radial antifriction bearings and the first and second axial antifriction bearings comprising an integrally formed one-piece outer bearing ring;
the integrally formed one-piece outer bearing ring possessing a first track in which is positioned the first roll bodies, a pair of second tracks in which are positioned the two rows of second roll bodies, a third track in which is positioned the third roll bodies, and a fourth track in which is positioned the fourth roll bodies; and
the first, second, third and fourth tracks being axially spaced apart from one another.

17. Bearing assembly according to claim 16, wherein one of the two radial antifriction bearings and the first axial antifriction bearing comprise an inner bearing ring, the inner bearing ring having a track in which is positioned the first roll bodies and a track in which is positioned the third roll bodies.

18. Bearing assembly according to claim 16, wherein one of the two radial antifriction bearings and the first axial antifriction bearing comprise a one inner bearing ring, the one inner bearing ring having a track in which is positioned the first roll bodies and a track in which is positioned the third roll bodies, and wherein the other of the two radial antifriction bearings and the second axial antifriction bearing comprise an other inner bearing ring, the other inner bearing ring having a track in which is positioned the fourth roll bodies and tracks in which are positioned the two rows of second roll bodies.

19. Bearing assembly according to claim 18, wherein a radially inwardly extending portion of the outer bearing ring is positioned between the one inner bearing ring and the other inner bearing ring.

20. Bearing assembly according to claim 19, further comprising a spacer sleeve positioned radially between the bevel pinion and the radially inwardly extending portion of the outer bearing ring, the spacer sleeve being positioned axially between the one inner bearing ring and the other inner bearing ring to axially space apart the one inner bearing ring and the other inner bearing ring.

* * * * *